METHOD OF MAKING TAPER LEAF SPRINGS
Original Filed April 20, 1965 2 Sheets-Sheet 1
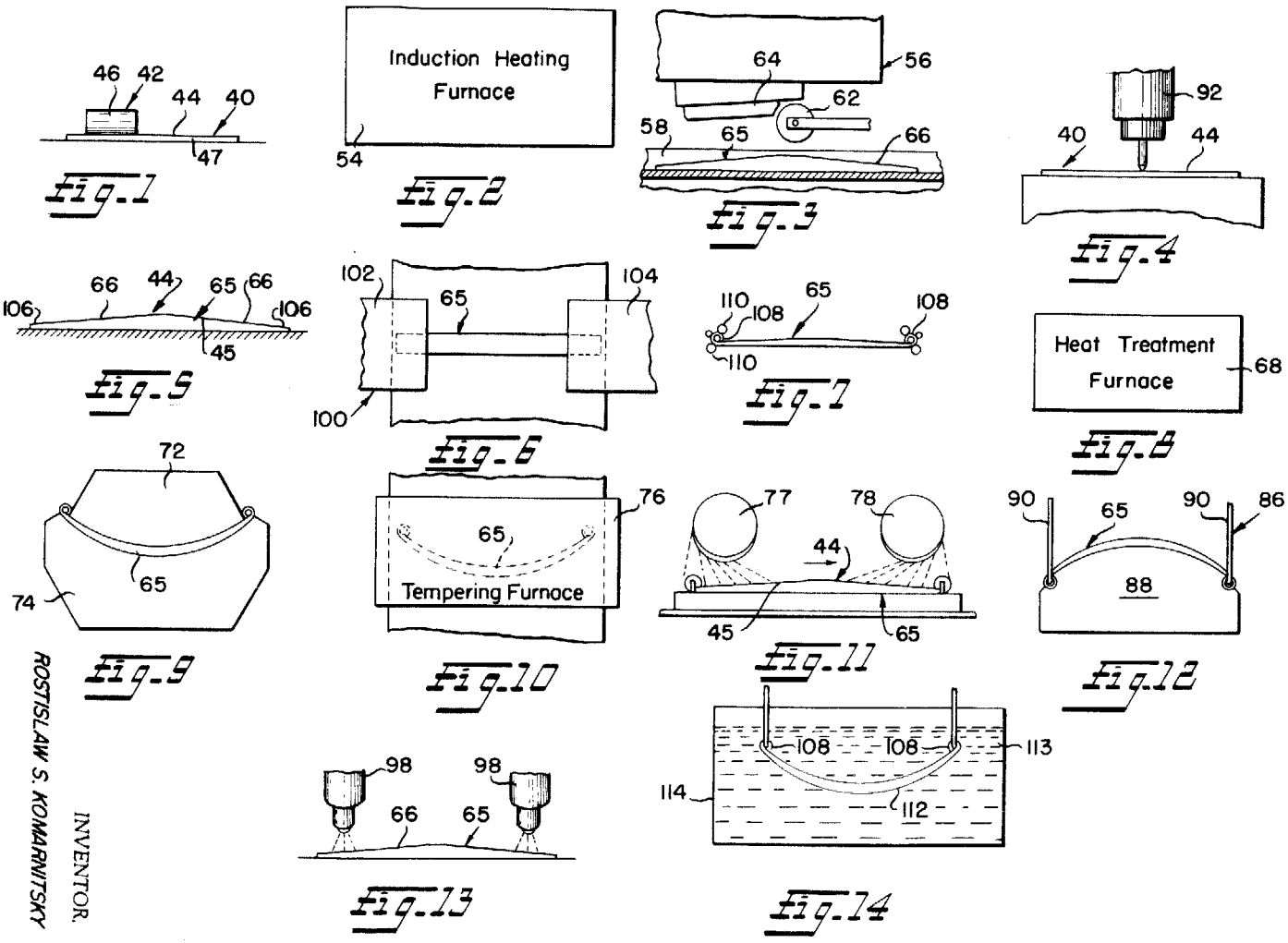
INVENTOR.
ROSTISLAW S. KOMARNITSKY
BY Strauch, Nolan, Neale, Nies and Bronaugh
ATTORNEYS

METHOD OF MAKING TAPER LEAF SPRINGS

Original Filed April 20, 1965 2 Sheets-Sheet 2

INVENTOR
ROSTISLAW S. KOMARNITSKY

BY Strauch, Nolan, Neale, Nies and Bronaugh
ATTORNEYS

United States Patent Office

Re. 26,714
Reissued Nov. 18, 1969

26,714

METHOD OF MAKING TAPER LEAF SPRINGS

Rostislaw S. Komarnitsky, Poway, Calif., assignor to North American Rockwell Corporation, a corporation of Delaware Original No. 3,345,727, dated Oct. 10, 1967, Ser. No. 449,585, Apr. 20, 1965. Application for reissue Nov. 19, 1968, Ser. No. 794,827
Int. Cl. B21f *35/00*
U.S. Cl. 29—173 18 Claims

Matter enclosed in heavy brackets [ ] appears in the original patent but forms no part of this reissue specification; matter printed in italics indicates the additions made by reissue.

ABSTRACT OF THE DISCLOSURE

A finished steel spring leaf is preferably formed by taper rolling, and the surface at the side which is to be the tension surface in operation together with the opposite side edge surfaces extending adjacent and along said tension surface are ground and subsequently *shot or* stress peened.

The present invention relates to an improved method of making tapered leaf springs and is particularly applicable in the manufacture of taper leaf spring assemblies for vehicles.

Over the years, it has been standard practice to use conventional multileaf spring bundles in vehicles for absorbing road shocks. While such spring bundles are generally satisfactory for absorbing a large percentage of normal road shocks, they are undesirably heavy and they produce a considerable amount of interleaf friction which objectionably affects the spring deflection by increasing the spring rate. Another serious objection of multileaf springs is that it is generally impossible to obtain a uniform spring rate under various road conditions wherein the same incremental variation in load produces the same incremental spring deflection.

In an effort to eliminate these problems existant with multileaf springs, recent efforts have been directed to the development of parabolic tapered leaf steel springs, and the present invention is concerned with a further improvement of such springs to materially increase the fatigue life thereof.

Among the chief factors to which reduction of spring fatigue resistance and consequent failures are generally attributed are decarburization of metal surface layers, surface irregularities including rolled-in scale and oxide penetrations, and the effect of certain mechanical treatments.

To improve fatigue resistance, prior to this invention spring leaves were shot or stress peened following heat treatment. However, the expected percentages increase in the useful life of the spring leaf afforded by *shot or* stress peening was not fully obtained in prior fabricating methods.

The present invention contemplates a novel improved method of making tapered leaf springs in which the spring leaf is subjected to grinding operations at least on certain surfaces to remove decarburization films, surface imperfections, scale and oxide prior to the taper rolling and shot peening or strain peening operation after heat treatment. It has been found that by so grinding the blank before taper rolling and shot or strain peening, a tapered leaf spring of unexpected and immensely increased fatigue life is obtained particularly in comparison to the life of tapered spring leaves which are shot or strain peened without the novel grinding operation. With the present invention, therefore, preparatory grinding is utilized to great advantage in prolonging the useful life of the spring leaf. While it is preferred to carry out the grinding operation prior to the sequential operations of taper rolling, heat treating and shot or strain peening, the grinding operation may alternatively follow the taper rolling operation.

It is an important object of the present invention to improve the spring fatigue resistance by subjecting an unfinished spring leaf to a novel grinding operation prior to a taper rolling and shot or strain peening operation in a method wherein the strain peening operation follows the sequential steps of taper rolling and heat treating.

The invention herein is an improvement over that disclosed in U.S. Letters Patent No. 3,238,072, issued Mar. 1, 1966 to Greene et al. and assigned to Rockwell-Standard Corporation, assignees of the present application. Related to the present application is the inventor's copending Ser. No. 449,486, filed Apr. 20, 1965, for Tapered Leaf Springs, now Patent No. 3,339,908.

Another object of the invention is to provide a novel method of making a tapered leaf spring where a spring steel blank is sequentially tapered, heat treated and then shot or strain peened, and wherein the surface of the leaf which is to be the tension surface in the finished spring leaf and the adjacent longitudinal edges of the spring leaf are subjected to grinding as a prior operation to *shot or* stress peening them.

Further objects of the invention will appear as the description proceeds in connection with the appended claims and the annexed drawings wherein:

FIGURE 2 is a diagrammatic view of an induction heating furnace for heating the ground spring leaf blank to hot working temperature;

FIGURE 3 is a diagrammatic view of a taper rolling apparatus;

FIGURE 4 is a diagrammatic view of an optional spring leaf piercing and drilling apparatus which is sued when a spring leaf is provided with a locating hole if required;

FIGURE 5 is an elevation of a tapered spring leaf following the taper rolling operation and piercing;

FIGURE 6 is a diagrammatic view of an optional heating furnace for preparing the spring leaf for an attachment eye forming operation if so required;

FIGURE 7 is a diagrammatic view of an optional apparatus for forming attaching eyes if so required;

FIGURE 8 is a diagrammatic view of a furnace for heating a spring leaf preparatory to a cambering operation;

FIGURE 9 is a diagrammatic view of a spring leaf cambering apparatus;

FIGURE 10 is a diagrammatic view of a spring leaf tempering furnace;

FIGURE 11 is a diagrammatic view of a spring leaf strain peening apparatus;

FIGURE 12 is a diagrammatic view of a pre-setting apparatus;

FIGURE 13 is a diagrammatic view of a leaf inspection station; and

FIGURE 14 is a diagrammatic view of a spring leaf coating station for applying a corrosion resistant film to the finished spring leaf;

FIGURE 15 is an enlarged cross section through the spring leaf of the present invention illustrating more in detail the grinding operation;

FIGURE 16 is a further enlarged partial cross section of one side of a leaf spring shown prior to the grinding operation.

Figure 1S:
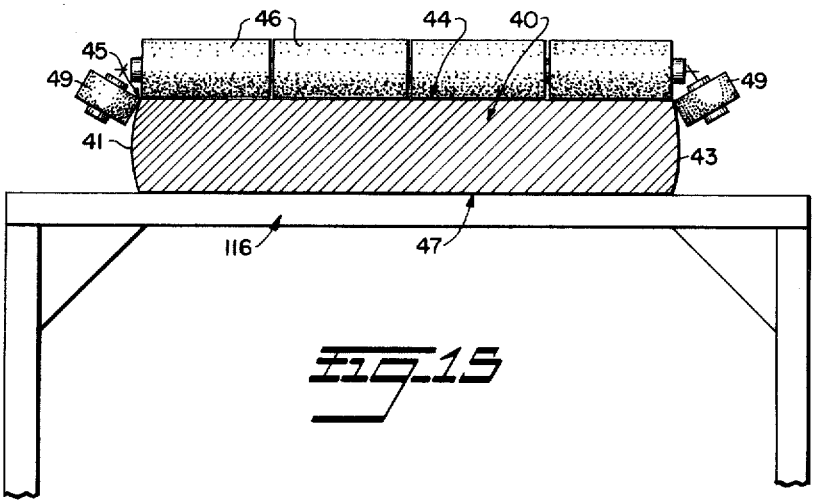
FIGURE 1 is a diagrammatic view illustrating the preliminary surface grinding operation of a flat spring steel blank in accordance with the present invention.
Figure 1B:
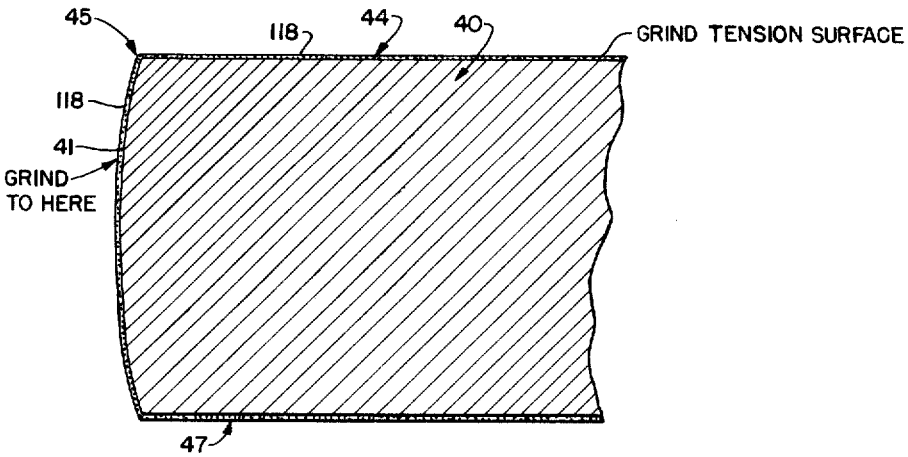

Referring to FIGURE 1, a flat sided spring steel blank or billet 40 cut to proper length is placed in a grinding apparatus 42 for grinding the surface 44 of blank 40 which will be the tension surface of the spring leaf as finally formed. Apparatus 42 preferably comprises grinding belts 46 which are adapted to engage surface 44. The grinding apparatus 42 also includes grinding belts or the like (see FIGURE 15) for grinding both edge surfaces 41 and 43 adjacent the tension side of the blank. While for some springs it may be acceptable to grind only the tension surface for the purpose it has been discovered as a very important part of the invention that grinding of both the tension surface 44 and adjacent edge surfaces 41 and 43 is extremely beneficial to further increase the fatigue life of the spring. Other forms of grinding machines (not shown) may also be used, such as, for example, grinding wheels. Grinding of surface 44 and edge surfaces 41 and 43 in accordance with the present invention removes any decarburization films, surface imperfections, scale and oxide to provide smooth flat surfaces. For example a typical steel leaf spring was found to have a decarburized surface layer about 0.015" deep which ranged in hardness from an outer surface hardness of about 35 Rockwell C to the inner uniform leaf hardness of about 46 Rockwell C. This harmful layer was removed from the tension side and adjacent edges of the grinding operation to produce a leaf spring of high quality.

With particular reference to FIGURES 15 and 16 the blank 40 shown in cross section comprises a lower surface 47 which will become the compression surface and an upper surface 44 which will become the tension surface. Both surfaces are laterally connected by opposite edge surfaces 41 and 43 respectively.

To grind the tension surface 44 the blank 40 is placed on the grinding machine table, conveyor, or the like 116 with its tension surface up and a number of grinding discs, belts, etc. 46 are brought in contact with the tension surface 44. The outermost 49 of the grinding devices extend around the edges 45 of the edge surfaces 41 and 43 to simultaneously grind the upper portions of the sides immediately adjacent the tension side 44.

Referring to FIGURE 16 the blank 40 when it comes from the rolling mill shows a surface layer of decarburized material 118 which may extend continuously around all surfaces or only part of the surfaces. This surface decarburization is harmful and prevents effective surface treatment of the leaf spring blank such as taper rolling, shot peening, etc. especially at the side which is to become the tension surface. As for instance, during taper rolling, flakes of hard mill scale may be pressed into the surface and thus causing the occurrence of stress raisers in the tension surface layer, which may become the nuclei of fatigue cracks and lead to early fracture of the leaf spring.

Although the decarburization may be removed by grinding all surfaces of the blank it is necessary only to remove it from the side which is to become the tension side and portions of the sides immediately adjacent the tension side as indicated in FIGURE 16 since the edge portions of the sides extending from the tension side are subject to tension stresses and if only the tension side would be ground leaving decarburization on the edge surfaces 41 and 43 early fatigue failures may occur due to the surface imperfections at the highly stressed portions of edge surfaces adjacent the tension surface.

The side 47 of blank 40 opposite from tension surface 44 which is to become the compression surface also may be ground in the same manner as surface 44, although not necessary or it may be shot blasted prior to final heat treatment to clean the blank and remove any scale left from the steel mill rolling operation. However, grinding or shot blasting of the side 47 of blank 40 opposite from tension side 44 will normally not be necessary, since presence of decarburized layer and stress raisers on the surfaces, which are subjected only to compression stresses, is not detrimental to the longevity of the spring.

Following the grinding operation, blank 40 is then heated in a suitable furnace 54 (FIGURE 2) to a temperature of from 1200° F. to 2250° F. in preparation for a hot taper rolling operation. Heating of blank 40 is advantageously, though not necessarily, accomplished by induction heating to produce a gradual increase of temperature extending towards the ends of blank 40 depending upon the amount of hot rolling to be done in the tapering operation. This treatment minimizes grain growth in spring blank regions subjected to comparatively little hot working in the rolling operation and is readily accomplished by special design of induction heating units.

After blank 40 is heated to its hot working temperature it then is conveyed to a taper rolling machine 56 (FIGURE 3) where it is hot taper rolled Alternatively, surface 44 and adjacent edge surfaces 41 and 43 may be ground following the heat treatment in furnace 54 and preceding the taper rolling operation in machine 56.

In tapered leaf springs, the spring must be designed so that the operating stresses are uniformly distributed throughout the length of the leaf. In other words, the leaf must be of variable thickness or variable width, or both. To facilitate manufacture and reduce cost and for other reasons, if it preferred to produce a tapered spring leaf which varies in thickness only. The taper extends preferably from a maximum thickness at or near the spring mounting block towards a minimum thickness at or near the end or ends. The leaf ends may be of constant thickness to form attachment eyes.

To obtain the foregoing tapered configuration, blank 40 may be preferably roll tapered by the method and apparatus disclosed in United States Letters Patent No. 3,145,-591, issued Aug. 25, 1964 to F. R. Krause, to which reference should be made for complete details, such method and apparatus being only schematically illustrated in FIGURE 3 to an extent deemed necessary to understand the present application. The foregoing apparatus is suitable to produce heavy duty spring leaves, however, for light duty spring leaves a taper roll machine as disclosed in copending application Ser. No. 205,333, filed June 26, 1962, now Patent No. 3,233,444, granted Feb. 8, 1966, may be applied.

To reduce a single leaf spring having satisfactory suspension qualities over an appropriate range of deflection the thickness tolerance of the spring throughout its taper must be held to plus or minus 0.005 inch from a desired theoretical parabolic contour. For this reason, among others, the surface of blank 40 to be tapered which may be either the tension surface 44 or the opposite compression surface 47 must be essentially free from stress raising surface defects and must be maintained in this condition as the forming roll advances over it. In actual application the taper formation may appear on either the tension surface or the compression surface of the leaf spring.

As shown in FIGURE 3, the hot blank is placed in a die 58 seated on a support base of machine 56. A forming roll 62, mounted for rotation about an axis transverse to the longitudinal axis of blank 40, is then rolled longitudinally along the blank starting from the central portion of the blank and traveling first towards one end and then towards the other end. As previously mentioned, the spring leaf may terminate at both ends in a uniform thick portion in order to form attachment eyes. If a single forming roll 62 is used, the taper on one half of blank 40 is formed. The position of blank 40 is then reversed end for end and the other half of blank 40 is tapered. In a double end machine reversal of the blank is not necessary. Roll 62 is pressed against blank 40 by means of a contour cam 64 which is suspended above die 58 and which is mounted for movement longitudinally of the blank. As cam 64 moves to the right as viewed in FIGURE 3, it forces the roll 62 against blank 40 which is held against movement. Roll 62 is thus advanced over surface 44 of blank 40 by frictional engagement between roll 62 and blank 40 and between cam 64 and cam follower rollers (not shown) integral with and at each end of roll 62.

To maintain the accuracy of the taper, it is very important that no scale or other dirt come between the contacting surfaces of forming roll 62 and blank 40 or cam 64 and the cam follower rollers. The contour of cam 64 is such that, as it engages and advances roll 62, roll 62 shapes blank 40 to the desired tapered form described above, thus providing a tapered spring leaf indicated at 65 in FIGURES 4 and 3 and having tapered surfaces 66. When it is desired that the leaf will have a constant width and be tapered only in thickness, the die 58 shall be provided with a longitudinal cavity such that it effectively prevents the metal from spreading out laterally on the sides.

Following the taper rolling operation, the semi-finished tapered leaf 65 is conveyed to a heating furnace 68 (FIGURE 8) where it is heated to austenitizing temperature as a preliminary step to a subsequent camber forming and quenching operations. As shown in FIGURE 9, the camber is formed by mounting and clamping the thus heated spring leaf between curved complementary upper and lower die fixtures 72 and 74. Fixtures 72 and 74 are so formed relative to the desired curvature of the final spring leaf as to allow for changes in height of the camber particularly during a presetting operation to be described later on. The assembly comprising die fixtures 72 and 74 with the spring leaf 65 clamped in place is immersed in quenching oil for a period of time sufficient to obtain mortensitic transformation on the order of 95% or more. While this transformation is taking place, the semi-finished spring leaf 65 is retained under high clamping pressure between fixtures 72 and 74 to prevent distortion.

After removal from the quenching oil, spring leaf 65 is released from the fixtures 72 and 74 and is conventionally tempered in a conveyor type tempering furnace 76 (FIGURE 10) to relieve stresses imposed upon the spring during the forming and quenching operations.

Following the taper rolling, cambering and tempering operations, spring leaf 65 is shot or strain peened at least on its ground tension surface 44 and also on both longitudinal ground adjacent portions of side edge surfaces 41 and 43. The pulling apparatus may be of any conventional construction and may contain one or more shot throwing wheels, two of which are indicated at 77 and 78 in FIGURE 11. The tension surface 44 is pelted with shot from wheels 77 and 78 while the spring leaf is held by suitable clamps in a stressed condition wherein it is subjected to longitudinal bending. These wheels may be positioned at an angle to simultaneously peen the edge surfaces adjacent to tension surface 44, or added wheels may be provided for this purpose. When the strain peening is specified it shall be done at the stress which is as close to the yield point of the steel as conditions will permit.

The spring leaf 65, cambered prior to the strain peening operation, is preferably clamped in a substantially flat position by any suitable means. It will be appreciated that other conventional forms of shot peening apparatus may be employed, such as, for example, air nozzles. Shot peening relieves harmful residual tension stress, which could be present in the surface layer and introduces beneficial compressive stress.

Following shot or strain peening operation, the spring leaf is preferably transferred to a presetting or "bulldozing" assembly 86 illustrated in FIGURE 12. Assembly 86 comprises a rigid fixture 88 having a curved top surface over which the cambered spring leaf is reversely deflected in the direction of service loading by push rods 90 or other suitable means. The spring leaf is deflected by an amount exceeding the designed maximum service deflection and the yield point of the material. In this presetting or "bulldozing" operation, the cambered spring leaf is deflected from its curved unloaded configuration, through a flat configuration, to the reversely curved configuration shown in FIGURE 12. The presetting operation readjusts the normal camber height, reduces the possibility of permanent set from occurring in the spring leaf during service, and introduces residual compression stress in tension surface layer in addition to those introduced by shot or stress peening. The spring leaf when released from the presetting fixture returns to a cambered shape which is slightly relaxed from the cambered shape shown in FIGURE 9.

After the initial grinding operation and before taper rolling, at least the ground tension surface 44 and portions of the adjacent edge surfaces 41 and 42 of blank 40 may be treated to resist the formation of scale and oxide particularly while the blank is being taper rolled. This may be effectively accomplished for instance by contacting the ground blank with lithium vapor while the blank is being heated in furnace 54. The lithium vapor sticks to and coats the blank with a film which, in addition to preventing formation of scale and oxide, also acts as a lubricant in the rolling process.

Following the scale prevention treatment and before or after hot rolling, blank 40 may in certain instances be provided with a locating or anchor bolt hole or other known locating or centering means as shown in FIGURE 4. For reasons stated below in the fabrication of single spring leaves, the prior conventional locating or anchor bolt hole is preferably omitted and instead the leaf is provided with one or more impressions, dimples or studs preferably on the neutral axis of the edge surfaces of the leaf or on the compression side for locating and centering purposes to reduce the high stress raising effect caused by the conventional center bolt hole in the anchor area, as more fully illustrated and explained in copending application Ser. No. 411,285, filed Nov. 16, 1964, now Patent No. 3,305,231.

After the taper rolling operation the partly finished spring leaf 65 may be optionally subjected to a further grinding operation to remove any surface imperfections caused by the taper rolls particularly on the tension surface indicated at 44 and the adjacent edge surfaces 41 and 43. The spring leaf 65 then may be conveniently conveyed to a taper inspecting station (FIGURE 13) where the contour of the spring leaf taper is checked as by means of accurate thickness dimensions throughout the taper is very important.

Prior to cambering, spring attachment eyes may be formed, if desired, as shown in FIGURES 6 and 7 by first heating spring leaf 65 in a conveyor type right-hand and left-hand dual furnace 100 shown in FIGURE 6 and comprising two opposed heating units 102 and 104 respectively located on opposite sides of a conveyor 105. Leaf spring 65 is moved laterally between furnace units 102 and 104 to heat the spring end regions indicated at 106. To facilitate formation of eye attachments, end regions 106 are preferably of uniform thickness. Furnace units 102 and 104 may be of any suitable and conventional type and are preferably gas-fired to provide high intensity heat.

Immediately after heating, the spring leaf end regions are formed simultaneously into attachment eyes 108, as shown in FIGURE 14. The eye forming operation is performed by any conventional automatic double-end three-pass forming machine having forming rolls indicated at 110 in FIGURE 7.

After the presetting operation, the finished spring leaf indicated at 112 in FIGURE 14 is advantageously provided with a corrosion and scar resistant coating by immersing the spring leaf in a suitable coating solution 113 contained in a tank 114.

While it is preferred to grind tension side surface 44 and the adjacent edge surfaces 41 and 43 before the taper rolling operation, these surfaces may alternatively be ground after taper rolling to the form of FIGURE 5 and preceding the stress peening operation.

The feature of the invention residing in grinding and stress peening the side edge surfaces adjacent and along the tension surface over and above the grinding and stress peening of the tension surface disclosed and claimed in said Greene et al. Patent No. 3,238,072 results in elimination of any tendency for the finished spring to crack at those edges during operation, and so it contributes materially to even greater useful life of the spring.

Referring to FIGURE 16, grinding of the opposite side edge areas 41 and 43 preferably extends from the rounded corners 45 where they intersect tension surface 44 for a distance of at least about 35 percent the thickness of the spring leaf.

Test results conclusively demonstrate that the grinding operation, which heretofore was generally regarded to impair under certain conditions the fatigue resistance of the spring leaf, is actually essential to improve the spring leaf fatigue resistance. Grinding which may precede or follow the taper rolling operation of FIGURE 3 and [stress] peening which follows the taper rolling operation are essential in combination as herein disclosed to achieve the exceptional improvements in fatigue resistance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In the method of making a tapered leaf spring wherein a blank is taper rolled, heat treated and then [strain] peened on the side which is the tension surface in the finished spring, the step of grinding said tension surface and the adjacent longitudinal side edge areas prior to [strain] peening.

2. The method defined in claim 1 wherein said grinding step precedes the step of taper rolling said blank.

3. The method defined in claim 1 wherein said grinding step follows the taper rolling and precedes the step of heat treating said blank.

4. The method defined in claim 1, said blank being heated in a protective inert vapor immediately prior to said taper rolling for inhibiting oxide and scale formation.

5. The method defined in claim 1 wherein the taper rolled unfinished spring leaf is stressed for peening to a degree that is near but sufficiently short of the yield point to avoid permanent deformation.

6. The method defined in claim 2 wherein the spring blank is heated to a temperature in the order of 1200° F. to 2250° F. prior to taper rolling.

7. The method defined in claim 2 wherein prior to [stress] peening, the taper rolled leaf is heated to an austenitizing temperature, arcuately confined to form a desired spring camber while so heated, and quenched while so confined.

8. The method defined in claim 7 comprising the step of presetting said spring leaf by reversely bending it in the direction of service loading beyond the yield point of the steel.

9. In the method of making a tapered leaf spring wherein a steel blank is taper rolled, heat treated, and then peened while being subjected to longitudinal bending stress, the step of grinding that surface of the blank which is to be the tension surface of the finished leaf spring and the adjacent side edge surfaces of the blank prior to [strain] peening said surfaces.

10. In the method of making a tapered leaf spring defined in claim 9, said blank being ground prior to said taper rolling operation.

11. In the method of making a tapered leaf spring defined in claim 9, said blank being ground after the taper rolling operation.

12. A method of making a tapered spring leaf from a single blank of steel which comprises the sequential steps of (a) grinding that side of said blank which is to be the tension surface in the finished leaf and both longitudinal side edge areas adjacent said tension surface to remove scale, surface irregularities, decarburized regions and the like, (b) roll tapering said blank to substantially parabolic thickness contour at one side and (c) then [strain] peening said tension surface of the leaf.

13. The method defined in claim 12 wherein the side edges of said blank adjacent said tension surface are ground prior to said [stress] peening.

14. A method of making a tapered spring leaf from a single blank of steel which comprises the sequential steps of grinding the side of said blank which is to be the tension surface in the finished spring to remove surface imperfections, decarburized regions and the like for providing a smooth steel surface at said side that is substantially homogeneous with the rest of the blank, similarly grinding the side edges of said spring leaf adjacent said tension surface, roll tapering said blank at said tension surface, bending said rolled spring leaf to stress it to a degree that is near but sufficiently short of the yield point to avoid permanent deformation, and then mechanically working said tension surface of the stressed rolled spring leaf to relieve localized surface stresses.

15. A method of making a tapered leaf spring comprising the steps of providing for a steel blank of adequate size, grinding the blank along the longitudinal side edges and at least on the side thereof which is to be the tension surface of the finished spring leaf to remove decarburization film, surface imperfections, scale and oxide, heating the ground blank and treating the ground sides thereof to resist oxide and scale formation, taper rolling the prepared blank to provide a tapered spring leaf having a substantially parabolic contour on one side thereof, stressing the spring leaf to desired camber, and shot peening said side edges and the tension surface of the formed spring leaf while holding the leaf in stressed condition.

16. A method of making a single tapered leaf spring for vehicles comprising the steps of sequentially grinding a steel spring blank along the side edge surfaces and at least on the surface thereof to be used as the tension surface of the finished tapered spring leaf to remove any decarburization film, surface imperfections, scale and oxide that may be present, heating the ground blank to a temperature in the order of 1200° F. to 2250° F. treating the blank to resist oxidation and scale formation while being so heated, taper rolling the heated blank to form a tapered spring leaf having controlled thickness and substantially parabolic contour at one side, heating the tapered spring leaf to an austenitizing temperature and arcuately confining the spring leaf while so heated to form a desired spring camber, quenching the heated spring leaf while so confined, tempering the quenched spring leaf, [strain] *shot* peening the tempered spring leaf at least on the tension surface thereof to relieve localized surface stresses, and presetting the strain peened spring leaf by reversely bending the leaf in the direction of service loading beyond the yield point of the steel.

17. The method defined in claim 12 wherein said side edges are ground for about 35 percent of the thickness of the spring leaf and intersect said tension surface in relatively rounded corners.

18. *The method defined in claim 1, wherein said spring leaf is held in stressed condition during said peening.*

The following references, cited by the Examiner, are of record in the patented file of this patent or the original patent.

References Cited

UNITED STATES PATENTS

| | | | |
|---|---|---|---|
| 3,145,591 | 8/1964 | Krause | 72—244 X |
| 3,153,844 | 10/1964 | Roth | 29—173 |
| 3,233,444 | 2/1966 | Groves et al. | 72—207 |
| 2,608,752 | 9/1952 | Schilling | 29—173 |
| 3,238,072 | 3/1966 | Greene et al. | 29—173 X |
| 3,339,908 | 9/1967 | Komarnitsky | 267—47 |
| 3,345,727 | 10/1967 | Komarnitsky | 29—173 |

THOMAS H. EAGER, Primary Examiner

U.S. Cl. X.R.

29—557; 267—47

PO-1050
(5/69)

UNITED STATES PATENT OFFICE
CERTIFICATE OF CORRECTION

Patent No. Reissue 26,714 Dated November 18, 1969

Inventor(s) ROSTISLAW S. KOMARNITSKY

It is certified that error appears in the above-identified patent and that said Letters Patent are hereby corrected as shown below:

Column 1, line 57, change "percentages" to -- percentage --.

" 3, " 43, change "of" to -- by --.

" 4, " 32, insert a period (.) after "rolled".

" 4, " 60, change "reduce" to -- produce --.

" 5, " 61, change "pulling" to -- peening --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents